United States Patent [19]

Salzmann et al.

[11] Patent Number: 5,543,180
[45] Date of Patent: Aug. 6, 1996

[54] MOISTURE RESISTANT CERAMIC IGNITER FOR A BURNER

[75] Inventors: David R. Salzmann, Chambersburg; James C. Purington, Tannersville, both of Pa.

[73] Assignee: Ingersoll-Rand Company, Woodcliff Lake, N.J.

[21] Appl. No.: 436,685

[22] Filed: May 8, 1995

Related U.S. Application Data

[60] Continuation-in-part of Ser. No. 289,951, Jun. 30, 1994, abandoned, which is a division of Ser. No. 68,465, May 27, 1993, Pat. No. 5,378,956.

[51] Int. Cl.$^6$ ............................................. B05D 3/02
[52] U.S. Cl. ................... 427/397.7; 427/397.8; 427/419.2
[58] Field of Search ............................ 427/397.7, 397.8, 427/419.2

[56] References Cited

U.S. PATENT DOCUMENTS

| | | | |
|---|---|---|---|
| 3,899,555 | 8/1975 | Takao et al. | 264/44 |
| 4,374,483 | 2/1983 | Kanoff | 174/90 |
| 4,567,103 | 1/1986 | Sara | 428/408 |
| 4,713,574 | 12/1987 | Scott | 313/130 |
| 4,911,775 | 3/1990 | Kuma et al. | 156/208 |
| 4,959,338 | 9/1990 | Miura et al. | 502/263 |
| 4,970,427 | 11/1990 | Schainwebel et al. | 313/146 |
| 5,052,926 | 10/1991 | Kawasaki et al. | 433/49 |
| 5,278,113 | 1/1994 | Ono et al. | 502/66 |

OTHER PUBLICATIONS

The PQ Corporation, Material Safety Data Sheet, Document 0629A, John G Blumberg May 18, 1990.
The PQ Corporation, the PQ Soluble Silicates in Refractory and Chemical Resistant Cements, Bulletin No. 24–1, Jun., 1983.
The PQ Corporation, PQ Potassium Silicates, Bulletin 17–108, May, 1989.
A Comprehensive Treatise on Inorganic and Theoretical Chemistry, by J. W. Mellor, D.SC, F.R.S., vol. VI, pp. 317–328, Copyright 1941.

Primary Examiner—Benjamin Utech
Attorney, Agent, or Firm—John J. Selko

[57] ABSTRACT

An igniter for a propane burner is made substantially impermeable to moisture by coating the porous ceramic igniter shell with at least one layer of an inorganic, nonmetallic coating, the coating being an alkali silicate formed from dehydrating liquid water-glass on the surface of the ceramic igniter shell.

7 Claims, 4 Drawing Sheets

MOISTURE RESISTANT CERAMIC IGNITER FOR A BURNER

This application is a continuation in part of U.S. patent application Ser. No. 08/289,951, filed on Jun. 30, 1994, now abandoned, which is a divisional of U.S. patent application Ser. No. 08/068,465, filed on May 27, 1993, which issued as U.S. Pat. No. 5,378,956 on Jan. 3, 1995.

BACKGROUND OF THE INVENTION

This invention relates generally to igniters made from ceramic materials, which igniters are used in burners on mobile construction equipment, such as a screed on an asphalt paving machine, and more particularly to providing such ceramic materials with a coating that provides the ceramic material with improved resistance to penetration of the ceramic material by moisture or water.

Asphalt pavers use an automatic ignition and safety shutdown system to control ignition and monitor burning of propane on a screed of the paver. Prior art systems employ (among other components) a silicon carbide igniter element which is encased in a ceramic body, with a refractory filler in the ceramic body to hold the lead wires and igniter element in place. The igniter serves two functions in the system. It acts as a resistance heater to ignite the propane fuel and as vehicle for transmission and reception of a high voltage signal used to detect the presence of flame in the burner.

The ceramic prior art materials are extremely porous and absorb moisture readily. Moisture in the unit causes interference with the high voltage detection signal, and in conjunction with the heat of the burner causes corrosion and premature failure of the electrical connection between silicon carbide and the lead wires.

The foregoing illustrates limitations known to exist in present ceramic materials for igniters in screeds for paving machines. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an igniter having a ceramic shell; electrical wire means encased therein with a refractory cement; an igniter tip connected to the electrical wire, adjacent one end of the shell; a flexible refractory potting compound anchoring the wire at another end of the shell; an inorganic, nonmetallic silicate coating on the surface of the shell, the coating being substantially impermeable to moisture; and an electrical connector attached to the wire, for connecting the igniter to an electrical power source.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
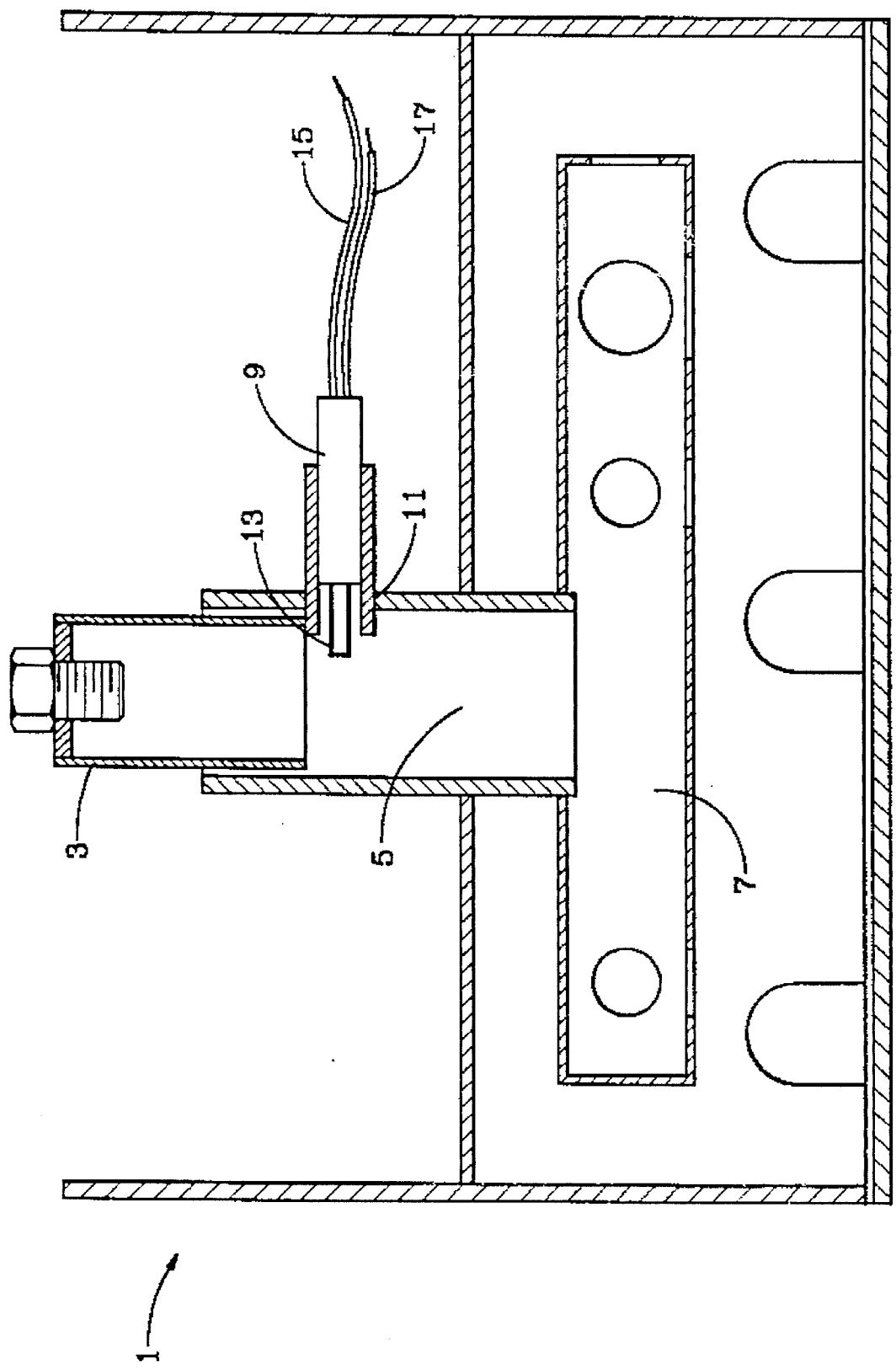
FIG. 1 is a schematic view, in partial cross section, of a paving screed having the igniter of the invention thereon.

FIG. 1 shows a conventional screed 1 with a burner 3 positioned thereon. When burner 3 is operating, a flame (not shown) exists in throat 5 and into inner chamber 7 on screed 1 for heating thereof. Details of the screed 1 are well known and form no part of this invention.

Burner 3 is initially ignited by igniter 9 that is positioned at inlet 11 to throat 5 at a location whereby a silicon carbide tip 13 on igniter 9 extends into throat 5. A propane and air mixture flows through throat 5 and is ignited by the resistance heating of tip 13. The resistance heating is caused by a 12 volt, 1.8 to 2.4 amp D.C. electrical signal carried to igniter 9 by first lead wire 15 from an electrical power source. Circuitry for this power source is well known and forms no part of this invention. Once flame is initiated, it is self sustaining, and no further ignition is required from igniter 9.

A short time after ignition (about 8 seconds) igniter 9 is automatically switched over to electrical circuitry, whereby igniter 9 is operated as a flame sensing and monitoring device. This is accomplished by reason of the fact that an electrical flame sensing signal of high voltage, low amperage (50–100 volts, 1–2 milliamps A.C.) is continuously transmitted to igniter 9 by a second lead wire 17 from an electrical power source. In the presence of a flame in throat 5, this sensing signal is transmitted from igniter tip 13, through the flame to ground against the screed 1, and returned through igniter 9, but the sensing signal is rectified by the flame to an identifiable shape or configuration. Suitable sensing devices and circuitry are provided to receive and detect this rectified signal. In the absence of flame in the throat 5, no rectified signal is received, and the sensing device transmits a "flame out" signal to automatically shut down the feed of fuel to the system. Thereafter, the operator must begin a flame initiation sequence again to start up the burner. The electrical circuitry for generating and detecting the sensing signal and for transmitting the shut down signal is well known and forms no part of this invention. The presence of moisture in igniter 9 will cause interference with transmission of the flame sensing signal, resulting in repeated "flame out" signals being transmitted. This state of affairs will last until the igniter 9 heats up to the degree that the moisture is evaporated.

Figure 2:
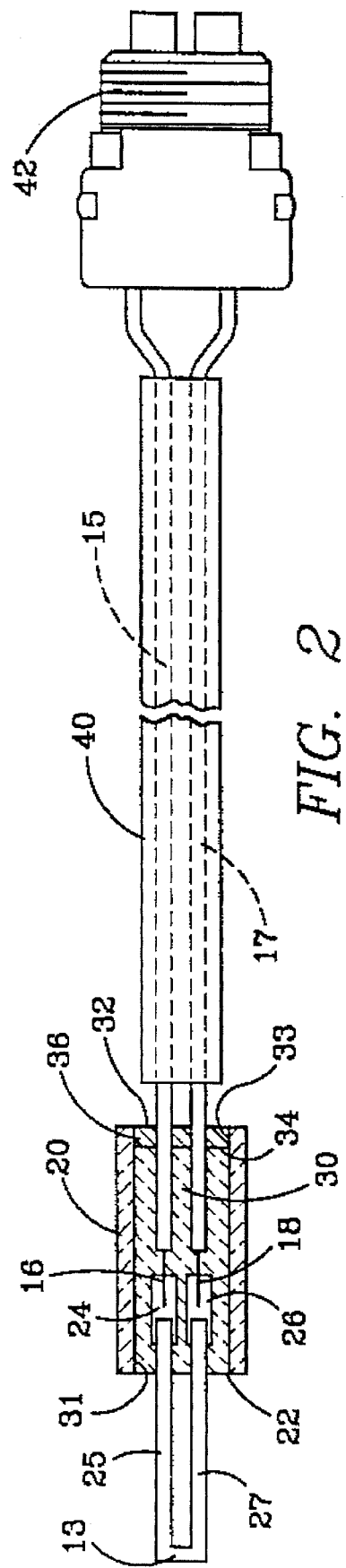
FIG. 2 is schematic view, in partial cross section of an igniter of the invention.

Now referring to FIG. 2, igniter 9 is shown to include an elongated, hollow, cylindrical, tubular ceramic shell 20 into which first and second insulated lead wires, 15, 17 extend. Shell 20 is composed of a ceramic material that includes refractory silicates (or mixtures thereof) of: Mg, Al, K, CA, and Ti. Other refractory materials will work, so long as the shell 20 is capable of operating at the required temperature range for the application, for screeds. We prefer shell 20 to be a cordierite refractory material supplied as a refractory shell by Norton Company under the designation Model 301T Mini Igniter.

Lead wires 15, 17 extend axially along shell 20 to terminate at a terminal end 16, 18, adjacent a forward end 22 of shell 20. Each lead wire terminal end 16, 18 is connected, as by brazing to one end of a braze pad 24, 26, respectively. A U-shaped silicon carbide tip 13 is connected, as by brazing, to the other end of braze pads 24, 26. One leg 25 of tip 13 is brazed to braze pad 24 and the other leg 27 of tip 13 is brazed to braze pad 26. Legs 25, 27 are joined at a terminal end of tip 13 outside of shell 20.

Lead wires 15, 17, braze pads 24 and 26, and legs 25, 27 are fastened in shell 20 by refractory cement 30 with suitable temperature resistance properties. We prefer cement 30 to be a refractory material supplied by Sauereisen Cements Company, of Pittsburgh, Pa., under the material tradename of "Sauereisen Electrotemp Cement #8". Cement 30 seals opening 31 at forward end 22, and extends from forward end 22 to a position adjacent, but not quite reaching rearward end 32 of shell 20, whereby a depression, or well, 34 is provided at rearward end 32. Well 34 is filled with a layer 36 of flexible potting compound having suitable temperature resistant properties. Layer 36 seals opening 33 at rearward end 32. We prefer a silicone adhesive sealant sold by General Electric Company under the material tradename of "RTV 116". The potting compound provides flexibility to the lead wires 15, 17, so as to avoid crimping them as they might move in shell 20.

Lead wires 15, 17 are insulated with teflon, and outside shell 20, they are additionally encased in a suitable fiberglass sleeve 40. Wires 15, 17 extend to a suitable electrical connector 42.

Figure 3:
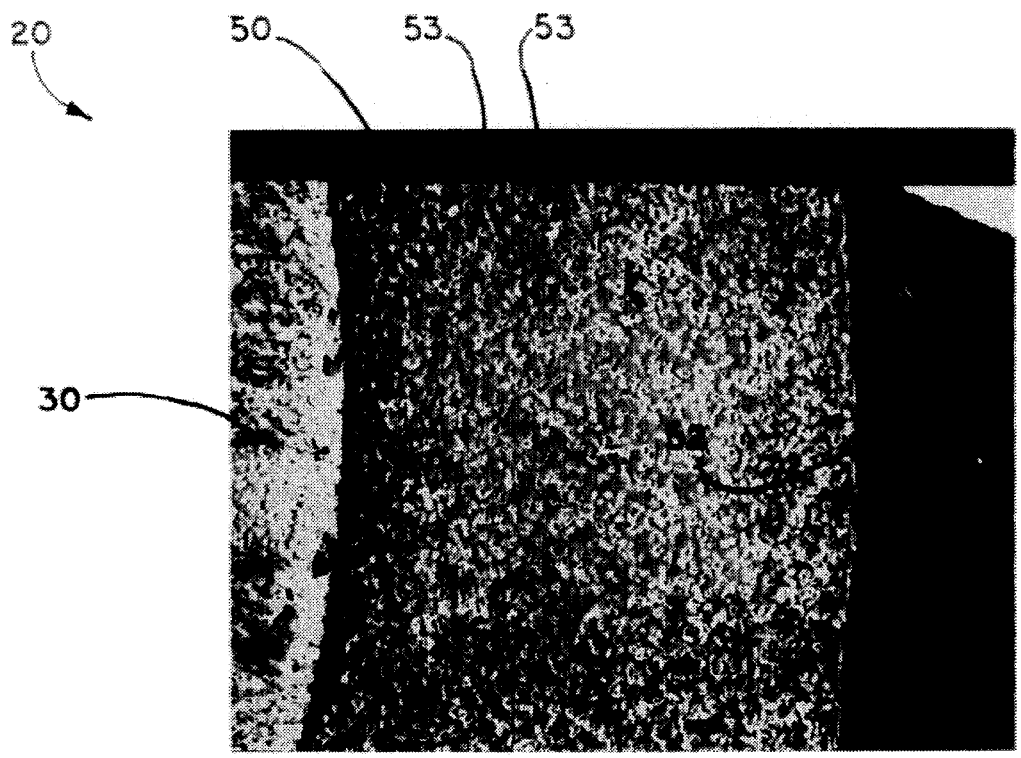
FIG. 3 is a photomicrograph, at magnification 58X, of a cross section of an igniter with the coating of the invention thereon.
Figure 4:
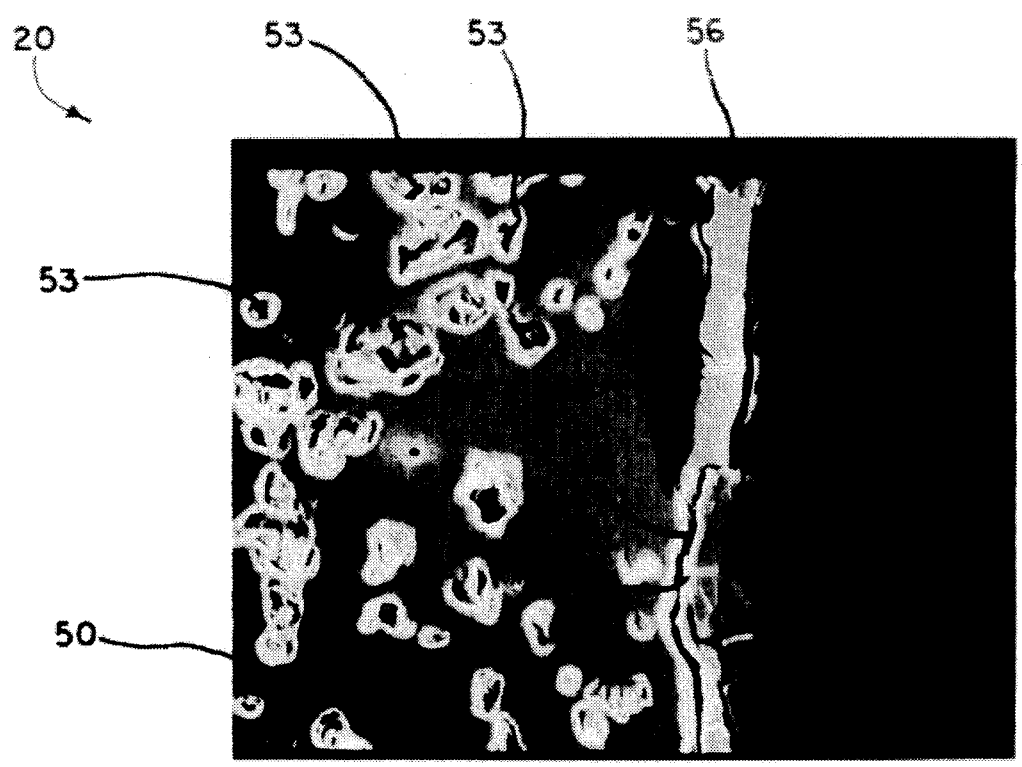
FIG. 4 is a view similar to FIG. 3, at magnification 511X.

Now referring to FIG. 3, there is shown a photomicrograph, at magnification 58X, of a partial cross section through the shell 20 illustrating the ceramic base material 50 of shell 20 having thereon a moisture resistant coating 52 of this invention. Coating 52 forms an essentially contiguous surface layer over the entire shell 30, the forward end 22 and cement 30 thereat and the rearward end 32. The potting compound layer 36 is added to well 34 after coating 52 is applied, as described hereinafter. Refractory cement 30 is also shown. Voids 53 are distributed throughout shell 20, and make shell 20 susceptible to penetration by moisture. Coating 52 is an alkali silicate coating having the characteristics of being a refractory, heat-resistant, opaque, layer bonded to the matrix 50. As seen in FIG. 4, coating 52 is segmented, that is, has a plurality of minuscule cracks 56 that extend in a direction substantially perpendicular to the surface 58 of matrix 50. These cracks 56 make the coating 52 columnar, and provide the coating 52 with a certain amount of flexibility, to avoid flaking and spalling due to inherent brittleness of the silicate material. Longitudinally extending cracks 60 that are parallel to the surface 58 are mechanically caused by sample preparation. We believe that the bonding between matrix 50 and layer 52 is primarily chemical, but some mechanical bonding can occur.

The method of this invention whereby coating 52 is applied will now be described. A water-soluble alkali silicate solution known in the art, and referred to herein, as "water-glass", is the starting material. We prefer a potassium silicate material supplied by The P.Q. Corporation, Industrial Chemicals Division, of Valley Forge, Pa., under the registered Trademark KASIL #1. This material has the following analysis:

| Wt. Ratio SiO₂/K₂O | 2.5 |
| --- | --- |
| % K₂O | 8.3 |
| % SiO₂ | 20.8 |
| Viscosity | 0.4 |
| @ 20° C. (poises) Density | |
| °Be | 29.8 |
| lb/gal | 10.5 |
| Characteristic | Thin, syrup |

Figure 5:
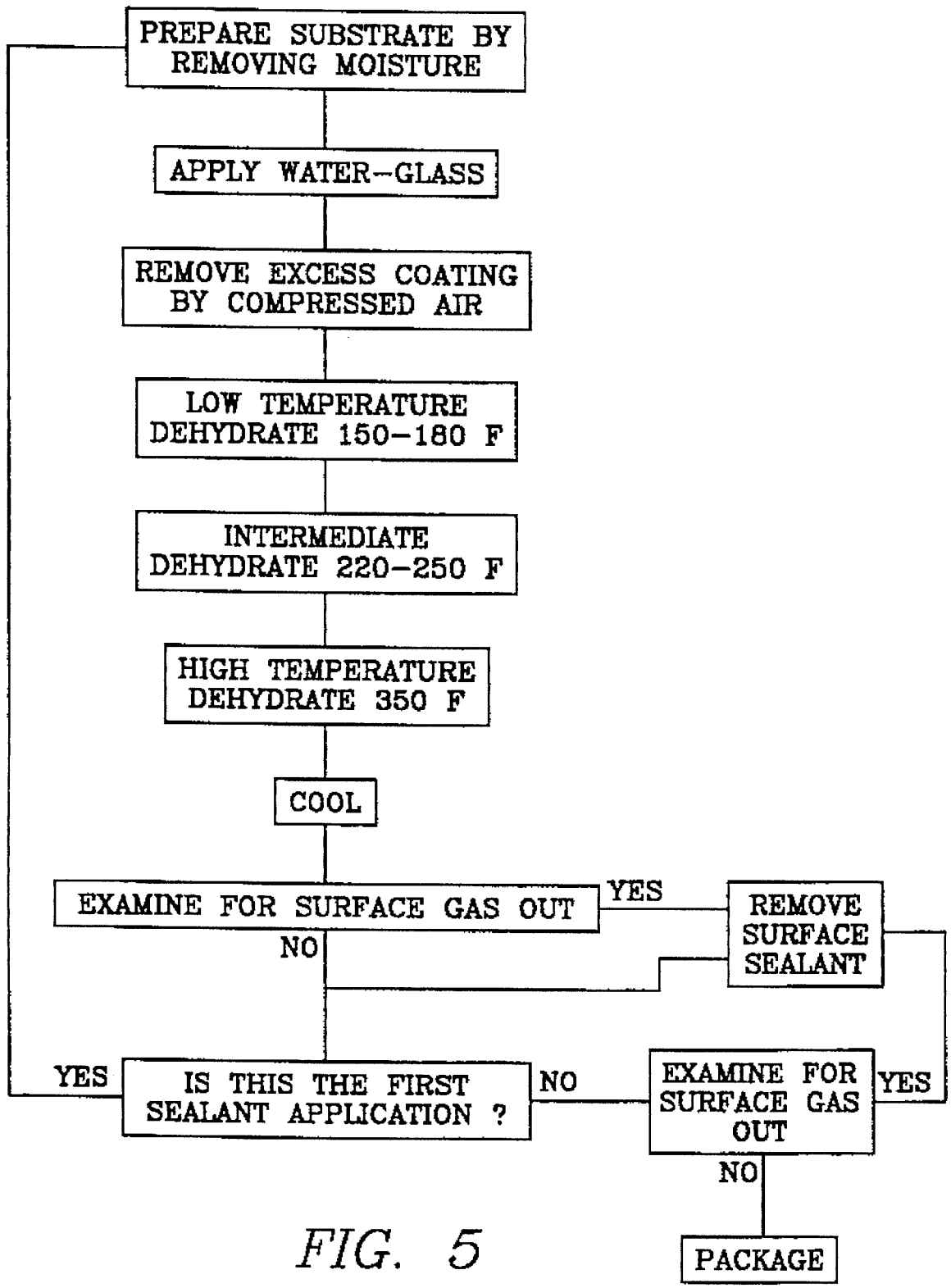
FIG. 5 is a flow diagram showing the preferred method of applying the coating of the invention.

The water-glass is diluted with 50% by weight by water to the desired viscosity. As seen in FIG. 5 the preferred mode of this method is shown. Shells 20 are heated above 212 degrees F. to remove moisture. Shells 20 are dipped to apply the liquid coating of water-glass. At least a portion of the water-glass not absorbed or soaked up into the porosity of the substrate is blown free of excess water-glass by compressed air of conventional pressure (under 20 psi.), suitable to operate air-driven hand tools such as wrenches, grinders or the like. The water-glass so removed is referred to herein as "excess water-glass". Thereafter, the water-glass remaining in the substrate is cured (converted into a solid film) in an electric furnace in an air atmosphere, as described hereinafter.

Silicates are converted to solid films or bonds by two methods: (1) evaporation of water (dehydration) or (2) a chemical setting mechanism. The soluble silicate used for this invention is dehydrated by evaporation drying. For the silicate bond or film to become impermeable and relatively insoluble, water must be completely removed. Air drying alone is not adequate. Heating too quickly may cause steam to form within the film, resulting in gas bubbles being entrapped in the coating. Curing is preferred to be done in three stages: a low temperature stage, at about 150–180 degrees F., for about 45 minutes; an intermediate temperature stage at about 220–250 degrees F., for about 45 minutes; and a high temperature stage at about 350–400 degrees F., for at least 30 minutes.

The shell 20 is is allowed to cool in ambient air to below 120 degrees F. for handling and so as to retard the final curing action to prevent the coating from becoming too viscous too quickly. A too viscous coating at this point would entrap bubbles of gas in the silicate coating. Such entrapped bubbles are referred to herein as "gasout." Gasout, is removed by sanding or rubbing, with an abrasive material. Since the porous substrate can soak up sealant unevenly, the coating and curing process is preferred to be repeated to provide two coats on the surface, to insure complete coating. However, this second coating process is optional, depending upon the requirements of the coated part.

While the preferred water-glass herein is a water soluble potassium silicate, it would be equivalent to use a water soluble sodium silicate water-glass having properties and composition similar to the potassium silicate water-glass.

Having described the invention, what is claimed is:

1. A method for producing an inorganic, nonmetallic coating on a porous, ceramic substrate, said coating being substantially impermeable to moisture penetration, comprising:

a. providing a porous, moisture-bearing ceramic substrate;

b. removing moisture from said substrate;

c. applying a first liquid coating of water-glass to said substrate, said water-glass being partly absorbed by said substrate and partly unabsorbed by said substrate;

d. removing at least a portion of said liquid water-glass not absorbed by said substrate; and e. curing said liquid water-glass by dehydration to provide a first substantially contiguous coating of only silicate on said substrate.

2. The method of claim 1 wherein said water-glass is a water soluble potassium silicate.

3. The method of claim 2 wherein said substrate is a material consisting essentially of silicates of Mg, Al, K, Ca, and Ti.

4. The method of claim 2 wherein said substrate consists essentially of cordierite.

5. The method of claim 4 wherein said curing step further comprises:
   a. a first, low-temperature dehydrating;
   b. a second, intermediate-temperature dehydrating; and
   c. a third, high-temperature dehydrating.

6. The method of claim 5 wherein said curing is done in an electric furnace, in air, with said low temperature dehydrating at about 150–180 degrees F., for about 45 minutes; said intermediate dehydrating at about 220–250 degrees F., for about 45 minutes; and said high temperature dehydrating at about 350–400 degrees F., for at least 30 minutes.

7. The method of claim 4 further comprising:
   a. inspecting said substrate for gas bubbles entrapped in said first silicate coating;
   b. removing at least a portion of said gas bubbles entrapped in said first silicate coating upon completion of said curing;
   c. applying a second liquid coating of water-glass over said first silicate coating said second coating of liquid water-glass being partly absorbed by said first silicate coating and said substrate and partly unabsorbed by said first silicate coating and said substrate;
   d. removing at least a portion of said liquid water-glass not absorbed by said first silicate coating and said substrate; and
   e. curing said second coating of liquid water-glass.

* * * * *